(12) United States Patent
DeKeyser

(10) Patent No.: US 8,928,752 B2
(45) Date of Patent: *Jan. 6, 2015

(54) RECORDING DEVICE WITH PRE-START SIGNAL STORAGE CAPABILITY

(75) Inventor: Paul DeKeyser, Irvine, CA (US)

(73) Assignee: Stellar LLC, Irvine, CA (US)

( * ) Notice: Subject to any disclaimer, the term of this patent is extended or adjusted under 35 U.S.C. 154(b) by 1619 days.

This patent is subject to a terminal disclaimer.

(21) Appl. No.: 11/846,217

(22) Filed: Aug. 28, 2007

(65) Prior Publication Data

US 2008/0055410 A1 Mar. 6, 2008

Related U.S. Application Data

(60) Provisional application No. 60/824,095, filed on Aug. 31, 2006.

(51) Int. Cl.
*H04N 7/18* (2006.01)
*G08B 13/196* (2006.01)

(52) U.S. Cl.
CPC .......... *H04N 7/188* (2013.01); *G08B 13/19621* (2013.01); *G08B 13/19676* (2013.01)
USPC ........................................................ 348/148

(58) Field of Classification Search
None
See application file for complete search history.

(56) References Cited

U.S. PATENT DOCUMENTS

| | | | |
|---|---|---|---|
| 5,381,526 A | 1/1995 | Ellson | |
| 5,523,799 A * | 6/1996 | Hattori et al. | 348/715 |
| 5,689,442 A | 11/1997 | Swanson et al. | |
| 5,790,427 A | 8/1998 | Greer et al. | |
| 6,163,338 A | 12/2000 | Johnson et al. | |
| 6,317,817 B1 | 11/2001 | Shichiku et al. | |
| 6,831,652 B1 | 12/2004 | Orr | |
| 6,950,600 B2 | 9/2005 | Dietz | |
| 7,162,607 B2 | 1/2007 | Macy et al. | |
| 7,263,073 B2 * | 8/2007 | Petite et al. | 370/278 |
| 2002/0005895 A1 | 1/2002 | Freeman et al. | |
| 2004/0183912 A1 | 9/2004 | Szolyga et al. | |
| 2006/0158968 A1 * | 7/2006 | Vanman et al. | 369/27.01 |
| 2007/0132773 A1 | 6/2007 | Plante | |
| 2007/0174538 A1 | 7/2007 | Christoffersson et al. | |

FOREIGN PATENT DOCUMENTS

| | | |
|---|---|---|
| EP | 0510968 | 10/1992 |
| WO | 99/56216 | 11/1999 |

* cited by examiner

*Primary Examiner* — Nhon Diep
(74) *Attorney, Agent, or Firm* — Fish & Tsang LLP

(57) ABSTRACT

A surveillance system uses a flash or other memory to store multiple data streams, each of which includes pre-start signal and post-start signal data. An area of the memory is preferably utilized as a circular buffer, in which a second data stream can be recorded without overwriting a first data stream. Buffers can have sufficient to capacity to capture up to an hour or more of image frames. All suitable methods and apparatus for initiating start and stop signals are contemplated, including for example using a button, toggle or other switch, a verbal or other human interface, and using motion, sound, light or other sensors. It is also contemplated that embodiments can include an interface for altering or otherwise designating a pre-signal size of the recently used segment. Cameras according to present invention can be mounted in any desired manner, including for example in camera boxes, on eyeglasses, and on automobiles or other vehicle.

18 Claims, 5 Drawing Sheets

```
Johnson      AAAA|A
(small            ╲
buffer             ╲ 11
only)
```

Figure 1 (prior art)

```
Reich        A|AAAA      _____
(small         ╲            ╲
buffer and      ╲ 21          ╲ 22
flash)
```

Figure 2A (prior art)

```
Reich        AAAAAA   AAAAAAAAAAAAAAAAAAAAAAAA|_____
(small         ╲            ╲
buffer and      ╲ 21          ╲ 22
flash)
```

Figure 2B (prior art)

```
                                                   ╭─ 30
DeKeyser     AAAAAAAAAAAAAAAAAAAAAAAAAAAAAAAAAAAAAAAAAAAAAAAAAAAAAAAAA
(variable    AAAAAAAAAAAAAAAAAAAAAAA|_____
buffer)      _____
             _____
             _____..._____
```

Figure 3A

```
DeKeyser                                               ┌─ 30
(variable    _____AAAAAAAAAAAAAA_____
 buffer)     _____
             _____BBBBBBBBBBBBBBBBBBBBBBBBBB
             BBBBBBBBBBBBBBBBBBBB|_____..._____
```

Figure 3F

```
                                                        ┌─ 30
DeKeyser     CCCCCCCCCCCCCCCCCCCCCCCCCCCCCCCCCCCCCCCCCCCCCCCCCCCCCCCC
(variable    CCCCCCCCCCCCCAAAAAAAAAAAAAAAACCCCCC|_____
 buffer)     _____
             _____BBBBBBBBBBBBBBBBBBBBBBBBBB
             BBBBBBBBBBBBBBBBBBBBBBCCCCCCCCCCCCCCCCC...CCCCCCCCCCCCCCCCCC
```

Figure 3G

```
                                                        ┌─ 30
DeKeyser     _____
(variable    __CCCCCCCCCCCCAAAAAAAAAAAAAAAACCCCCC|_____
 buffer)     _____
             _____BBBBBBBBBBBBBBBBBBBBBBBBBB
             BBBBBBBBBBBBBBBBBBBB_____..._____
```

Figure 3H

RECORDING DEVICE WITH PRE-START SIGNAL STORAGE CAPABILITY

This application claims priority to provisional application Ser. No. 60/824,095 filed Aug. 31, 2006.

FIELD OF THE INVENTION

The field of the invention is surveillance cameras.

BACKGROUND

It is often desirable to record an unexpected event (automobile accident, baseball hit, quick kiss, facial expression, etc), but by the time someone pulls out a camera and focuses on the target, the moment is gone. This problem has long been addressed in the surveillance industry by recording continuously for long periods of time. It is not unusual, for example, for banks or other secure facilities to capture and maintain day after day of surveillance tapes. The downside, of course, is that continuous recordings are costly in terms of equipment, storage, bulkiness, and so forth. Moreover, continuous recording is especially unsuitable for small recording devices such as those carried on eyeglasses.

U.S. Pat. No. 6,163,338 to Johnson et al. (December 2000) focused on the problem of filming automobile accidents. Instead of trying to record millions of frames over long periods of time, Johnson tried to solve the problem by continuously storing the most recent images in a small looping (circular) memory. Upon actuation of a trigger, the system protects the most recently used portion of the memory, and overwrites an older portion. Thus, upon receiving a trigger signal from an accident, a 30 second memory might end up storing 20 seconds before and 10 seconds after the accident.

A looping memory of a device according to Johnson is depicted in prior art FIG. 1. There a small looping memory 11 records frames or other data from a data stream "A". Each character initiates a small time period, perhaps five seconds, with the "|" character designating the current writing position. When the memory finishes writing to the last position, it returns to the first position and over-writes previously stored data. Upon receipt of a start signal (such as by actuation of a trigger), the memory continues looping for some period of time (corresponding to perhaps a third of the memory capacity), and then stops recording altogether. The recorded memory is protected until it is offloaded or reset.

Johnson and all other referenced extrinsic materials are incorporated herein by reference in their entirety. Where a definition or use of a term in an incorporated reference is inconsistent or contrary to the definition of that term provided herein, the definition of that term provided herein applies and the definition of that term in the reference does not apply.

One problem with Johnson is that the system can only store images from a very short time period. US 2004/0033058 to Reich et al. (publ. February 2004) contemplates an improvement that tries to solve that problem by using two different memories, a small (900 frame) looping buffer and a larger flash memory. In Reich, the trigger signal (record button) causes the buffer to be completely filled, and then additional images to be written to the flash memory until a stop button is pushed.

The Reich system is depicted in prior art FIGS. 2A-2B. In FIG. 2A, a small looping buffer 21 records data from data stream "A", with the current position marked with "|". The "_" character is used to initiate memory that has not been used, or has been used but has been marked for overwriting. In FIG. 2B, a start signal has been received, and the system responded by filling the buffer, and then starting to fill a flash memory 22. Regardless of whether the flash memory is eventually filled, both the buffer 21 and the flash memory 22 are effectively locked (protected) upon receipt of a stop signal.

From FIGS. 1 and 2A-2B, one can readily appreciate that both Johnson and Reich can accommodate only a single time period. A user cannot record a second event without overwriting or offloading the stored data from a first event. In addition, both Johnson and Reich still contemplate that the looping portion memory should be very small, perhaps 30 seconds or less. Such devices are completely inadequate for storing long pre-start signal images, such as a five or ten minute period prior to a trigger signal.

Thus, there is still a need for improvements in cameras and other surveillance devices that allow recordation of multiple events without overwriting or offloading, and that can include lengthy portions of data streams prior to start signal events.

SUMMARY OF THE INVENTION

The present invention provides apparatus, systems and methods in which a memory stores multiple data streams, each of which includes pre-start signal and post-start signal data.

Preferred embodiments include hardware that executes an instruction set that utilizes an area of the memory as a circular buffer, records the first data stream in the buffer; responds to a signal by protecting a recently used segment of the buffer, and records the second data stream in the buffer, without overwriting the protected segment. Buffers can be any suitable size, but have sufficient capacity to capture at least 1, 5, 10, 15, or 20 minutes of image frames (video data), and in some contemplated embodiments have sufficient to capacity to capture an hour or more of image frames.

All practical memories are contemplated, including especially multi-gigabit removable flash drives. The memory preferably utilizes different sections for the buffer at different times, with protected sub-sections being skipped over during storage of subsequent data streams. In some instances that may result in a given data stream being stored in logically dis-contiguous portions of the memory. Thus, one can consider the memory as having a multiple buffers, or as a single buffer of variable size and configuration. At least 20% of the memory is preferably used as the buffer.

All suitable methods and apparatus for initiating start and stop signals are contemplated, including for example using a button, toggle or other switch, a verbal or other human interface, and using motion, sound, light or other sensors. It is also contemplated that embodiments can include an interface for altering or otherwise designating a pre-signal size of the recently used segment. Default time spans for storing data (whether measured in time, number of frames, memory utilized or some other metric) can be advantageously associated with start and/or stop signals.

Cameras according to present invention can be mounted in any desired manner, including for example in camera boxes, on eyeglasses, and on automobiles or other vehicles.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWING

FIG. 1 is a schematic of memory usage in prior art devices according to Johnson.

FIGS. 2A-2B are schematics of memory usage in prior art devices according to Reich.

FIGS. 3A-3H depict schematics of memory usage in a device according to aspects of the present invention, progressively showing storage of multiple data streams.

DETAILED DESCRIPTION

In FIG. 3A a memory 30 stores data from data stream "A" up to the current position "|" marker. The "_" character is again used to initiate memory that has not been used, or has been used but has been marked for overwriting. The ellipsis " . . . " is used to initiate that the memory can be very large relative to the number of positions shown in the figure. It is contemplated, for example, that memory 30 can be up to several hundred megabytes, 1 GB, 2 GB, 4 GB, 8 GB or even more. Such memory is preferably of a flash type, non-volatile RAM, preferably in the form of a standard flash memory card.

Figure 3B:
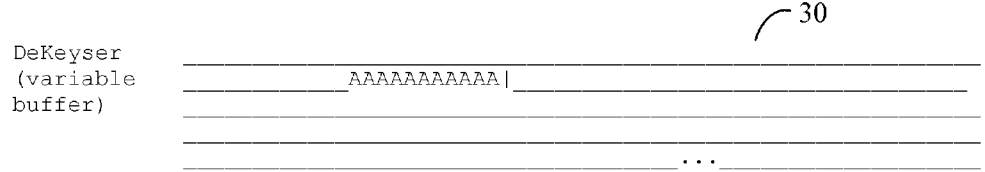

In FIG. 3B a recent period of data stream "A" has been protected as a function of a "start" signal, and concomitantly, the portion of the data stream prior to the protected portion has once again been marked "_" to shown that it is unprotected. The start signal can be triggered in any suitable manner, including for example manual operation of a trigger by a user. In other examples, start signals can be triggered by detection of a particular circumstance by a motion, sound or other sensor. In yet another example of a very sophisticated system, software can operate upon content in the data stream, such as by monitoring an entrance to a building using a data stream received from one or more cameras, and sending a start signal when the images it receives show a person moving in a suspicious manner.

In protecting recent data, the system can protect a default historical time period (such as 30 seconds, 2 minutes, etc), and all suitable defaults are contemplated. Alternatively, the historical time period being protected could be altered in some manner, such as by software or by a user operating a history button. For example, if a user hits a start button, the system might default to protecting the last 30 seconds, and then progressively protect prior 30 second periods when the user repeatedly hits a "more time" button. In that manner a user could protect a 5 or 10 minute period, or an even much longer portion of a data stream prior to a start signal. Indeed, if memory 30 is interpreted as a multi gigabyte flash memory, it is entirely possible that one could back up sufficiently to protect an hour or more of such a data stream.

Figure 3C:
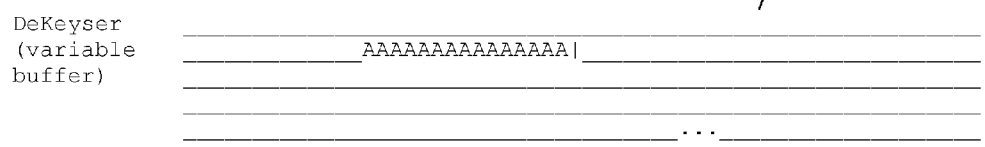

In FIG. 3C the system has received a "stop" signal some time after receiving the start signal, thereby lengthening the protected portion of the "A" data stream. The stop signal could be generated from software or hardware as a function of a default time after the start signal. All suitable defaults are contemplated, including for example a 30 second or 1 minute time period. Stop signals could also be generated in a variable fashion, again as a function of software or hardware, through action of a user, or in any other suitable manner. Thus, a user might well operate a start button or other switch, a more time switch, and a stop switch, which could have the same or different interfaces. It is also contemplated that the system could recognize a user's verbal commands for these functions. The system can further comprise a wireless receiver upstream of the buffer with respect to the data streams.

Just as the system can utilize a default pre-start signal period of time for which a portion of the data stream is stored unless overridden in some manner, contemplated systems can utilize a default post-start signal period of time for which a portion of the data stream is stored unless overridden in some manner. Using defaults for both pre-start and post-start signal periods allows a system to operate with an extremely high level of user convenience. For example, in one contemplated class of systems using such defaults, a user could operate a single button, ring or other interface to initiate a start signal, and the system could respond by automatically storing a default 60 second portion of a data stream prior to the signal, as well as a default 30 time period of the data stream after the signal. And all of that could be accomplished with a single operation of the button. As should be apparent from the description above, all reasonable the default time periods are contemplated.

Figure 3D:
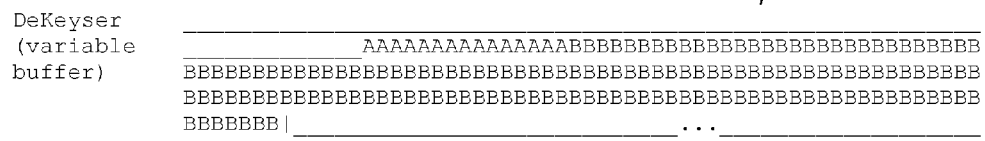

In FIG. 3D, the system has finished protecting the desired portion of the "A" data stream, and has now moved on to storing a "B" data stream. Of course, the "B" data stream may be continuous with the "A" data stream, so that differentiation of "A" and "B" streams is merely an artifact of how the data is being stored. For example, if a system included an eyeglasses camera being used at baseball game, the wearer might watch the game for an hour or more without anything of interest happening. During all that time the system would record image frames from the camera, looping in memory if the memory had remaining capacity for less than an hour of images. When finally the wearer sees an interesting play that he wants to protect, he operates a start button, and perhaps a more time button to protect the previous minute of play. Once the interesting action has completed, he operates a stop button, which thereby causes the system to complete protecting the entire "A" period of interest. But the wearer continues watching the game, and the subsequent images, continuous with the "A" images, would be considered "B" images.

Figure 3E:
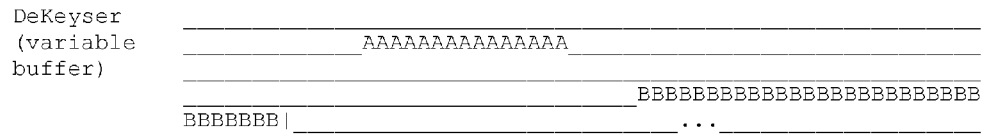

In FIG. 3E the system has again received a start signal, and again protected a fixed or variable historical time period. In FIG. 3F the system has received a stop signal, and has protected the entire desired portion of the "B" data stream.

In FIG. 3G the system continued to record data, which is now depicted as data stream "C" because it follows data stream "B". This figure is particularly significant in that recordation of the "C" data stream skips over the protected portion of the "A" data stream. In FIG. 3H the system received another start signal, and has protected a desired portion of the "C" data stream that straddles the protected "A" stream.

Figure 4:
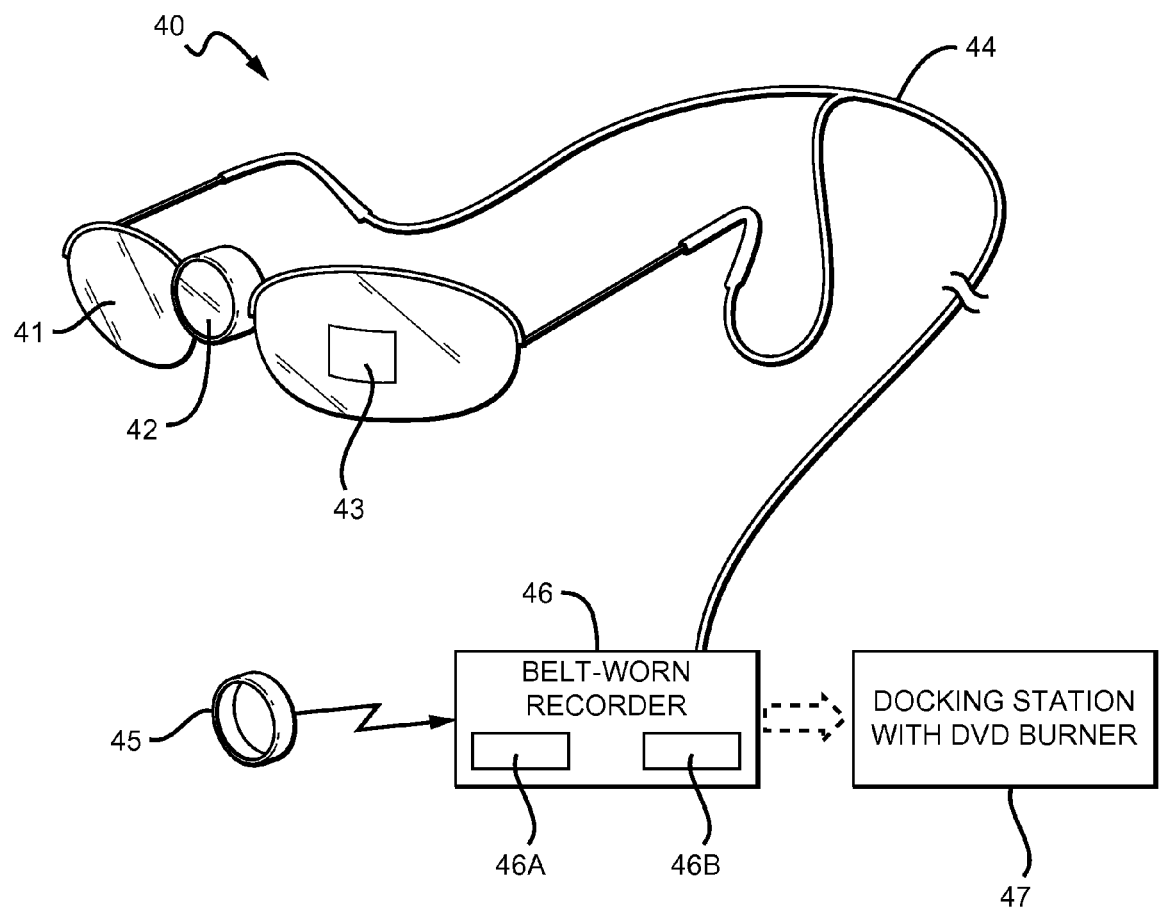
FIG. 4 is a schematic of steps for storing multiple data streams in a non-contiguous fashion

FIG. 4 depicts a system 40 generally comprising eyeglasses 41 having a camera 42 mounted at the nose bridge, and an optional viewfinder 43 applied onto one of the lenses. A data and power cord 44 couples the camera 42 to a belt-worn recorder 46, which cooperates with a ring-shaped signaling device 45 and an off-line docking station with CD burner (collectively 47).

The eyeglasses 41 are used here euphemistically to represent any type of camera mount, including a fixed or moveable surveillance mount, and also a housing such as a typical camera box. Camera 42 should also be interpreted euphemistically to include CCD and all other manner of image obtaining devices, as well as a directional microphone, one or more lenses, and so forth. Those skilled in the art will appreciate that the term "surveillance" is used herein in its broadest possible sense, to include not only professional or commercial types of surveillance, but also any other type of observation, including for example an ordinary person watching a baseball game or birthday party.

Recorder 46 is any recording device that records video and/or audio/video data, including conventional recorders. Recorder 46 preferably include a processor 46A that runs software to accomplish the functions described herein, and one or more physical memories that are collectively referred to herein as memory 46B. The description of memory 30 herein can apply equally to memory 46B. Those skilled in the art will also appreciate that the concepts described herein with respect to video and/or audio/video data can be applied to recordation of purely audio, and in fact any other type of data stream, and this specification should be interpreted as expressly including such application.

Although not expressly shown, recorder 46 also includes an appropriate power supply or connection, supporting electronics, and a display or other interface. Recorder 46 would typically record images in digital format, but analog or combination formats are also contemplated.

Signaling device 45 is shown in the figure as a ring that communicates with the recorder wirelessly. The ring can have any suitable interfaces (not shown), including for example buttons on its outer periphery, or a sensor along its inner edge. Thus, turning the ring in one direction might produce a start signal, and continuing to turn the ring in that direction might extend backwards the time period that is protected. Where a default time period for storing pre-start signal data is used, extending the time can be considered overriding the default. Similarly, turning the ring in the opposite direction might produce a stop signal, and where a default time period for storing post-start signal data is used, extending the time can be considered overriding that default. Electronics for such a ring or other control device are readily available, and for example are similar to those used in key fobs. Indeed, signaling device 45 should be interpreted euphemistically to include key fob type devices.

Docking station and DVD burner 47 can be quite conventional, and can for example include a standard flash memory card reader coupled to a home or office PC.

Figure 5:
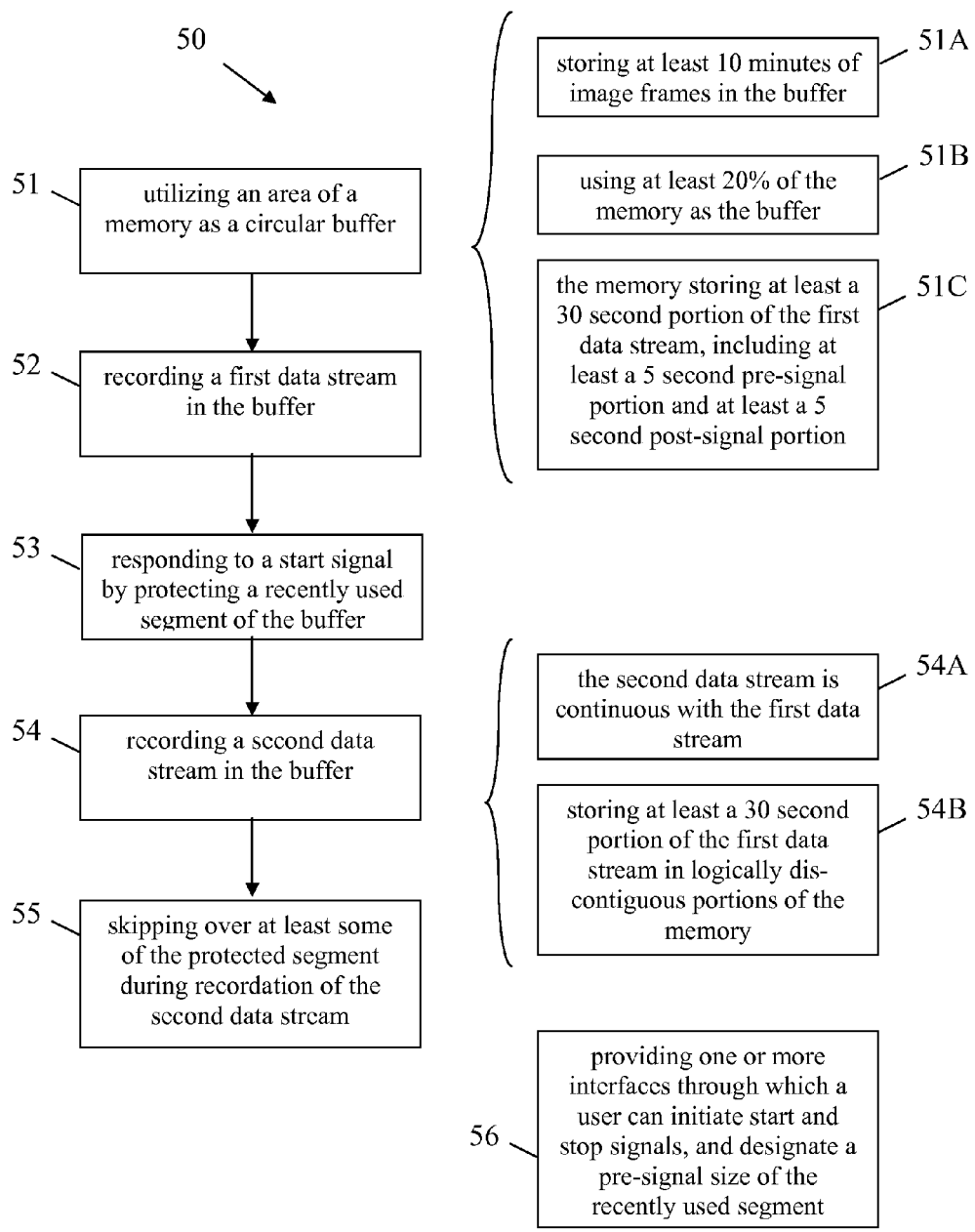
FIG. 5 is a schematic of a system using an eyeglasses mounted camera to record events.

FIG. 5 shows a method 50 of recording multiple events without overwriting or offloading the memory, and including potentially lengthy portions of data streams prior to start signal events. Contemplated steps include the following, which are discussed elsewhere herein:

Step 51—utilizing an area of a memory as a circular buffer;
Step 51A—storing at least 10 minutes of image frames in the buffer;
Step 51B—using at least 20% of the memory as the buffer;
Step 51C—the memory storing at least a 30 second portion of the first data stream, including at least a 5 second pre-signal portion and at least a 5 second post-signal portion;
Step 52—recording a first data stream in the buffer;
Step 53—responding to a start signal by protecting a recently used segment of the buffer;
Step 54—recording a second data stream in the buffer;
Step 54A—the second data stream is continuous with the first data stream; Step 54B—storing at least a 30 second portion of the first data stream in logically dis-contiguous portions of the memory;
Step 55—skipping over at least some of the protected segment during recordation of the second data stream; and
Step 56—providing one or more interfaces through which a user can initiate start and stop signals, and designate a pre-signal size of the recently used segment.

Thus, specific embodiments and applications of recording devices with pre-start signal storage capability have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A surveillance system comprising:
a camera that converts images into first and second data streams;
a memory; and
hardware that executes an instruction set that utilizes an area of the memory as a circular buffer, records the first data stream in the buffer; responds to a first signal by protecting a recently used segment of the buffer storing at least a portion of the first data stream corresponding to a duration of time prior to the first signal, while at the same time continuously recording the first data stream as the second data stream in an unprotected segment of the buffer, without overwriting the protected segment; and responds to a second signal received after the first signal by increasing the duration of the protected segment of the buffer prior to the first signal.

2. The system of claim 1, wherein the buffer stores at least 10 minutes of image frames.

3. The system of claim 1, wherein the second data stream is continuous with the first data stream.

4. The system of claim 1, wherein the memory stores at least a 30 second portion of the first data stream, including at least a 5 second pre-signal portion and at least a 5 second post-signal portion.

5. The system of claim 4, wherein the at least a 30 second portion of the first data stream is stored in logically dis-contiguous portions of the memory.

6. The system of claim 1, wherein at least 20% of the memory is used as the buffer.

7. The system of claim 1, further comprising a sensor that automatically initiates the first signal.

8. The system of claim 7, wherein the sensor operates upon content in the first data stream.

9. The system of claim 1, further comprising an interface through which a human can initiate the signal.

10. The system of claim 1, further comprising an interface through which a human can override a default pre-signal size of the recently used segment.

11. The system of claim 1, further comprising an interface through which a human can override a default post-signal size of the recently used segment.

12. The system of claim 1, further comprising a wireless receiver upstream of the buffer with respect to the first data stream.

13. The system of claim 1, further comprising a wearable mount for the camera.

14. The system of claim 1, further comprising a vehicle mount for the camera.

15. The system of claim 1, further comprising a signaling device in wireless communication with a recorder comprising the memory, and that is configured to wirelessly send the first signal to the recorder.

16. The system of claim 15, wherein the wireless signaling device comprises a human wearable ring.

17. The system of claim 15, wherein the wireless signaling device comprises a key fob.

18. The system of claim 15, wherein the wireless signaling device is local to the camera and the hardware, and local about a user.

* * * * *